US011159989B2

(12) United States Patent
Zhang et al.

(10) Patent No.: US 11,159,989 B2
(45) Date of Patent: Oct. 26, 2021

(54) DATA CACHING METHOD AND STORAGE MEDIUM

(71) Applicant: SHANDONG COMPUTER SCIENCE CENTER (NATIONAL SUPERCOMPUTER CENTER IN JINAN), Shandong (CN)

(72) Inventors: Wei Zhang, Shandong (CN); Xinchang Zhang, Shandong (CN); Huiling Shi, Shandong (CN); Jianwei Zhang, Shandong (CN); Yanling Zhao, Shandong (CN); Lu Wang, Shandong (CN); Meng Sun, Shandong (CN); Shaoju Tang, Shandong (CN); Yiran He, Shandong (CN)

(73) Assignee: Shandong Computer Science Center (National Supercomputer Center in Jinan), Shandong (CN)

( * ) Notice: Subject to any disclaimer, the term of this patent is extended or adjusted under 35 U.S.C. 154(b) by 141 days.

(21) Appl. No.: 16/615,277

(22) PCT Filed: May 14, 2019

(86) PCT No.: PCT/CN2019/086750
§ 371 (c)(1),
(2) Date: Nov. 20, 2019

(87) PCT Pub. No.: WO2020/133884
PCT Pub. Date: Jul. 2, 2020

(65) Prior Publication Data
US 2021/0243655 A1    Aug. 5, 2021

(30) Foreign Application Priority Data
Dec. 29, 2018 (CN) .......................... 201811637262.3

(51) Int. Cl.
*H04W 28/24* (2009.01)
*H04L 29/08* (2006.01)
*H04W 84/04* (2009.01)

(52) U.S. Cl.
CPC ......... *H04W 28/24* (2013.01); *H04L 67/2842* (2013.01); *H04W 84/045* (2013.01)

(58) Field of Classification Search
CPC ... H04W 28/24; H04W 84/045; H04W 28/02; H04L 67/2842
See application file for complete search history.

(56) References Cited

U.S. PATENT DOCUMENTS 10,243,860 B2 * 3/2019 Szilagyi ............... H04L 41/0853
2017/0318508 A1 * 11/2017 Berglund .......... H04W 36/0072
(Continued)

FOREIGN PATENT DOCUMENTS

CN        102647718 A      8/2012
CN        106302745 A      1/2017
(Continued)

*Primary Examiner* — Mehmood B. Khan
(74) *Attorney, Agent, or Firm* — Craft Chu PLLC; Andrew W. Chu (57) ABSTRACT

The data caching method and a storage medium includes acquiring, by receiving the request of caching service data sent by the UE, the network status data between an SBS corresponding to UE and the UE, the network status data between an MBS corresponding to the SBS and the UE, and the network status data between the UE and a data source of the service data. According to the types of the three pieces of network status data and the service data, three corresponding QoE values are acquired, and whether the cache is configured for the UE is determined according to the three QoE values. The quantification of the three QoE values is realized, and whether the cache is configured for the UE is determined according to the quantized QoE values, thereby (Continued)

achieving the effect of improving the quality of user experience.

5 Claims, 4 Drawing Sheets

(56) References Cited

U.S. PATENT DOCUMENTS

2017/0325120 A1* 11/2017 Szilagyi .............. H04L 41/5067
2018/0176325 A1*  6/2018 Liang .................. H04L 67/02
2020/0196209 A1*  6/2020 Cui .................... H04B 7/1851

FOREIGN PATENT DOCUMENTS

| CN | 106912079 A | 6/2017 |
| CN | 107682896 A | 2/2018 |
| CN | 108307446 A | 7/2018 |
| CN | 108668288 A | 10/2018 |
| CN | 108834080 A | 11/2018 |
| CN | 108848521 A | 11/2018 |
| KR | 20160092390 A | 8/2016 |

* cited by examiner

DATA CACHING METHOD AND STORAGE MEDIUM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of wireless communication technology, and more particularly, to a data caching method and a storage medium.

2. Description of Related Art Including Information Disclosed Under 37 CFR 1.97 and 37 CFR 1.98

The fifth generation communication technology (5G) focuses on improving the network in terms of energy consumption, performance, quality of user experience (QoE), and the like, and has attracted the attention of researchers around the world. Researches show that in the next 5 years, the application of 5G will enable the data transmission volume of the wireless network to reach 40 times of the current, reaching 93-3600Pet bytes, in which video transmission will be predominant. According to the statistic result of video service providers, the data accessed by the user is highly repetitive. Therefore, by caching the access content required by the user, the purpose of reducing the occupancy rate of the system bandwidth can be achieved.

In a typical 5G access cloud architecture, there are several Small Cell Base Stations (SBS). These SBSs are deployed in the range of the same Macro-cell Base Station (MBS). The SBSs can only perform data transmission with the users and the MBS within the signal range thereof, while the MBS can perform data transmission with all the network elements in the coverage area thereof. In order to improve the efficiency of data transmission, the access content required by the user can be cached at the base station SBS or MBS, and the user can download the required data from the base station. If the base station does not cache the data required by the user, then the data needs to be downloaded from the server of the content provider. However, the existing caching solution mainly caches the contents with a relatively high popularity value depending on the user access content, the consideration factor is single, and the demands of the user on other aspects of data caching cannot be met.

BRIEF SUMMARY OF THE INVENTION

The technical problem to be solved by the present invention is to provide a data caching method and a storage medium against deficiencies of the prior art.

The present invention solves the above technical problem with the following technical solution: a data caching method comprises: receiving a cache request sent by user equipment (UE), wherein the cache request is configured to request to cache service data; acquiring first network status data between an SBS accessed by the UE and the UE, second network status data between an MBS corresponding to the SBS and the UE, and third network status data between the UE and a data source of the service data, respectively; acquiring, according to the types of the first network status data, the second network status data, the third network status data, and the service data, three corresponding QoE values, respectively; and determining whether a cache is configured for the UE according to the three QoE values.

The present invention has the beneficial effects: by receiving the request of caching the service data sent by the UE, the network status data between the SBS corresponding to the UE and the UE, the network status data between the MBS corresponding to the SBS and the UE, and the network status data between the UE and the data source of the service data are respectively acquired; according to the types of the three pieces of network status data, and the service data, three corresponding QoE values are acquired, and whether the cache is configured for the UE is determined according to the three QoE values. The quantification of the three QoE values from the UE to the SBS, from the UE to the MBS and from the UE to the data source is realized, and whether the cache is configured for the UE is determined according to the three quantized QoE values, thereby achieving the effect of improving the QoE.

Based on the above technical solution, the present invention may further be improved as follows.

Further, determining whether a cache is configured for the UE according to the three QoE values comprises: when the $QoE_{source}$ corresponding to the third network status data is the largest of the three QoE values, determining not to configure the cache for the UE; otherwise, determining to configure the cache for the UE.

The beneficial effects of adopting the above further solution are: when the $QoE_{source}$ is the largest, that is, the QoE from the UE to the data source of the service data is the best, there is no need to configure the cache for the UE in the SBS or the MBS, thereby avoiding the waste of cache resources of the SBS and MBS, and also achieving the effect of best QoE.

Based on the above technical solution, the present invention may further be improved as follows.

Further, determining to configure the cache for the UE comprises:
  determining whether each of the SBS and the MBS has a cache space; and configuring the cache for the UE according to a first determining result.

Further, configuring the cache for the UE according to the determining result comprises: comparing the size of the $QoE_{MBS}$ corresponding to the second network status data and the size of the $QoE_{SBS}$ corresponding to the first network status data when the first determining result is that the SBS has the cache space; and determining that the SBS configures the cache for the UE when $QoE_{SBS} > QoE_{MBS}$.

Further, whether the MBS has the cache space is determined when $QoE_{SBS} < QoE_{MBS}$; and the cache is configured for the UE according to a second determining result.

Further, configuring the cache for the UE according to a second determining result comprises: determining that the MBS configures the cache for the UE when the second determining result is that the MBS has the cache space; otherwise, comparing the size of the $QoE_{source}$ and the size of the $QoE_{SBS}$; and determining that the SBS configures the cache for the UE when $QoE_{SBS} > QoE_{source}$.

The beneficial effects of adopting the above further solution are: by comprehensively determining the three QoE values and the cache space conditions of the SBS and MBS, the optimal device which can configure the cache for the UE is selected, thereby avoiding the failed caching caused by only considering the QoE values without considering the device cache space. Meanwhile, the SBS device is preferentially determined. The cache occupancy of the MBS is saved, the effective usage rate of the resource of the MBS is improved, and the QoE values are optimized to improve the QoE.

Based on the above technical solution, the present invention may further be improved as follows.

Further, determining whether the MBS has the cache space when the first determining result is that the SBS has no cache space; and configuring the cache for the UE according to a third determining result.

Further, configuring the cache for the UE according to a third determining result comprises: determining whether the MBS has the cache space when the first determining result is that the SBS has no cache space; and configuring the cache for the UE according to the third determining result.

Further, configuring the cache for the UE according to a third determining result comprises: comparing the size of the $QoE_{source}$ and the size of the $QoE_{MBS}$ when the third determining result is that the MBS has the cache space; and determining that the MBS configures the cache for the UE when $QoE_{MBS} > QoE_{source}$.

Further, when the third determining result is that the MBS has no cache space, the cache space is optimized.

The beneficial effects of the present invention are: by comprehensively determining the QoE values and the cache space conditions of the SBS and MBS, when the SBS has no cache space, the optimal device which can configure the cache for the UE is selected, thereby avoiding the failed cache application caused by only considering the QoE values without considering whether the SBS and MBS have the cache space. The QoE values are optimized to improve the QoE.

In addition, the present invention further provides a storage medium, wherein the storage medium stores instructions, which cause a computer to execute the data caching method according to any one of the above technical solutions when the computer reads the instructions.

The advantages of the additional aspects of the present invention will be given in part in the following description, and part of the advantages will become obvious from the following description, or through practice of the present invention.

BRIEF DESCRIPTION OF THE SEVERAL VIEWS OF THE DRAWINGS

In order to more clearly illustrate the technical solutions of the embodiments of the present invention, the accompanying drawings to be used in the embodiments of the present invention or the description of the prior art will be briefly described below. Obviously, the accompanying drawings described below are only some embodiments of the present invention, and other accompanying drawings may be obtained according to these accompanying drawings by those of ordinary skill in the art without creative efforts.

DETAILED DESCRIPTION OF THE INVENTION

The technical solutions in the embodiments of the present invention will be clearly and completely described in the following with reference to the accompanying drawings in the embodiments of the present invention. It is obvious that the described embodiments are only part but not all of the embodiments of the present invention. All other embodiments obtained by those of ordinary skill in the art based on the embodiments of the present invention without creative efforts shall fall within the scope of the present invention.

Figure 1:
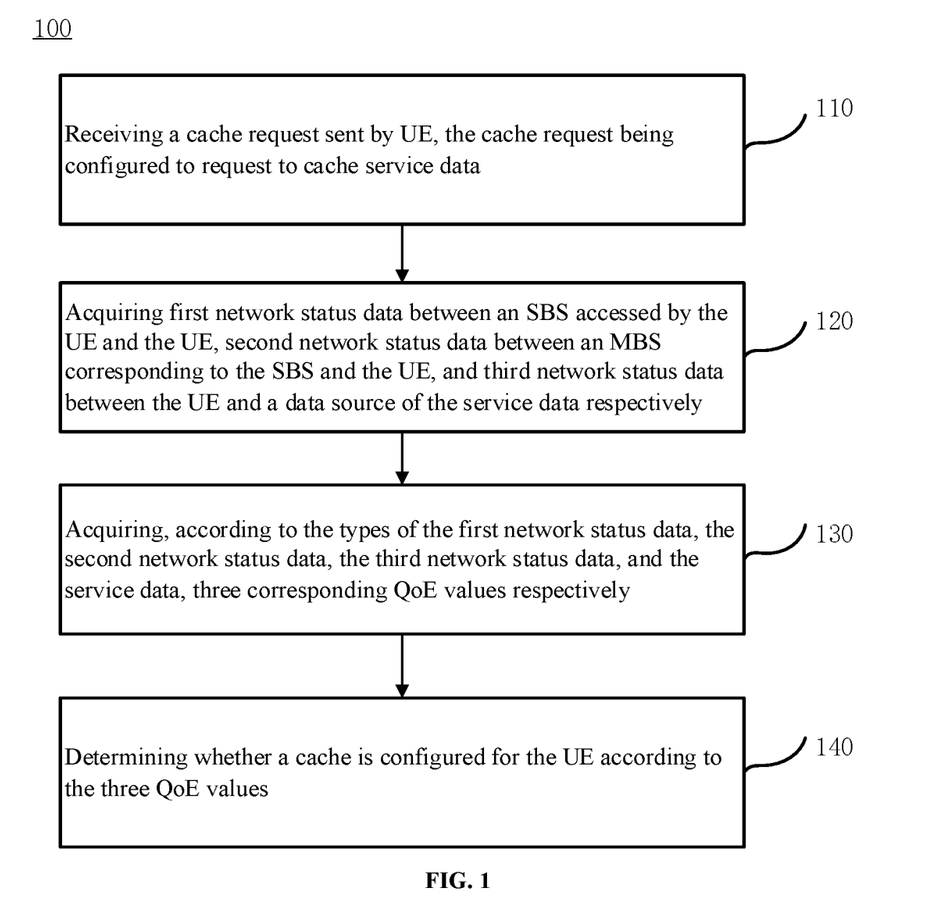
FIG. 1 is a schematic flowchart of a data caching method according to an embodiment of the present invention.

The data caching method 100 as shown in FIG. 1 comprises the following steps.

110. A cache request sent by UE is received, wherein the cache request is configured to request to cache service data.

Specifically, in the present embodiment, the cache request sent by the UE is received, and the service type needing data caching can be acquired from the cache request.

120. First network status data between an SBS accessed by the UE and the UE, second network status data between an MBS corresponding to the SBS and the UE, and third network status data between the UE and a data source of the service data are acquired respectively.

Specifically, in the present embodiment, the network status data between the SBS accessed by the UE and the UE, the network status data between the MBS corresponding to the SBS and the UE, and the network status data between the UE and the data source directly acquiring the service data are respectively acquired. The network status data comprises: network delay, network bandwidth, and a packet loss rate, and may also comprise other related network status data, which is not limited in the present embodiment of the present invention.

130. According to the types of the first network status data, the second network status data, the third network status data, and the service data, three corresponding QoE values are acquired respectively.

Specifically, in the present embodiment, according to the service type of the cached data requested by the UE, different weight values are set for the parameters such as the network delay, the network bandwidth, and the packet loss rate in the network status data, and the sum of these weight values is set to 1. For example, the caching of video data requires a relatively high network packet loss rate, the weight value set for the network packet loss rate parameter may be higher, and the weight values set for the network delay, the network bandwidth, and the packet loss rate of the video data service may be 0.3, 0.3, and 0.4.

Based on the weight values and the network status data, the QoE value is acquired by using a specific calculation method or data model, and the $QoE_{SBS}$ corresponding to the first network status data, the $QoE_{MBS}$ corresponding to the second network status data, and the $QoE_{source}$ corresponding to the third network status data are calculated.

For example, it is set that $QoE=\Omega_\alpha\alpha+\Omega_\beta\beta+\Omega_\gamma\gamma$, wherein $\Omega_\alpha$, $\Omega_\beta$, and $\Omega_\gamma$ are the weight values of the network delay, the network bandwidth, and the packet loss rate which are determined according to the service type of the cached data respectively, $\alpha$ is the reciprocal of the network delay data, $\beta$ is the network bandwidth data, and $\gamma$ is the reciprocal of the packet loss rate.

It should be noted that the foregoing is only an example of the present invention. There are many specific calculation methods and data models for the QoE according to the weight values and the network status data, and are not limited in the embodiment of the present invention.

140. According to the three QoE values, whether the cache is configured for the UE is determined.

Specifically, in the present embodiment, according to the calculated $QoE_{SBS}$, $QoE_{MBS}$, and $QoE_{source}$, whether the cache is configured for the UE in the SBS or the MBS or not is determined.

According to the data caching method provided in the above embodiment, the request of caching the service data sent by the UE is received, the network status data between the SBS corresponding to the UE and the UE, the network status data between the MBS corresponding to the SBS and the UE, and the network status data between the UE and the data source of the service data are respectively acquired; according to the types of the three pieces of network status data, and the service data, three corresponding QoE values are acquired, and whether the cache is configured for the UE is determined according to the three QoE values. The quantification of the three QoE values from the UE to the SBS, from the UE to the MBS and from the UE to the data source is realized, and whether the cache is configured for the UE is determined according to the three quantized QoE values, thereby achieving the effect of improving the QoE.

Figure 2:
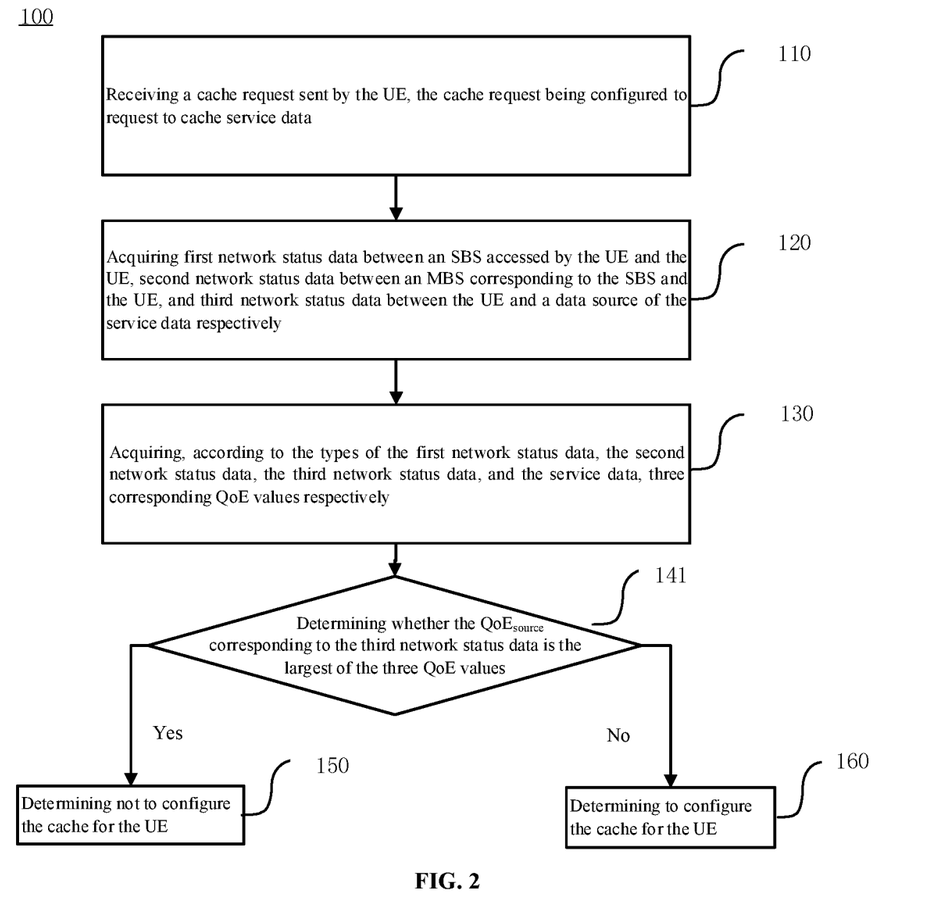
FIG. 2 is a schematic flowchart of a data caching method according to another embodiment of the present invention.

Specifically, in another embodiment, as shown in FIG. 2, the data caching method 100 comprises the following steps.

110. A cache request sent by UE is received, wherein the cache request is configured to request to cache service data.

120. First network status data between an SBS accessed by the UE and the UE, second network status data between an MBS corresponding to the SBS and the UE, and third network status data between the UE and a data source of the service data are acquired respectively.

130. According to the types of the first network status data, the second network status data, the third network status data, and the service data, three corresponding QoE values are acquired respectively.

141. Whether the $QoE_{source}$ corresponding to the third network status data is the largest of the three QoE values is determined.

If yes, step 150 is executed, and if not, step 160 is executed.

150. It is determined that the cache is not configured for the UE.

160. It is determined that the cache is configured for the UE.

According to the data caching method provided by the above embodiment, when the $QoE_{source}$ is the largest, it is indicated that the QoE from the UE to the data source of the service data is the best, and there is no need to configure the cache for the UE in the SBS or the MBS, thereby avoiding the waste of cache resources of the SBS and MBS, and also achieving the effect of best QoE.

Figure 3:
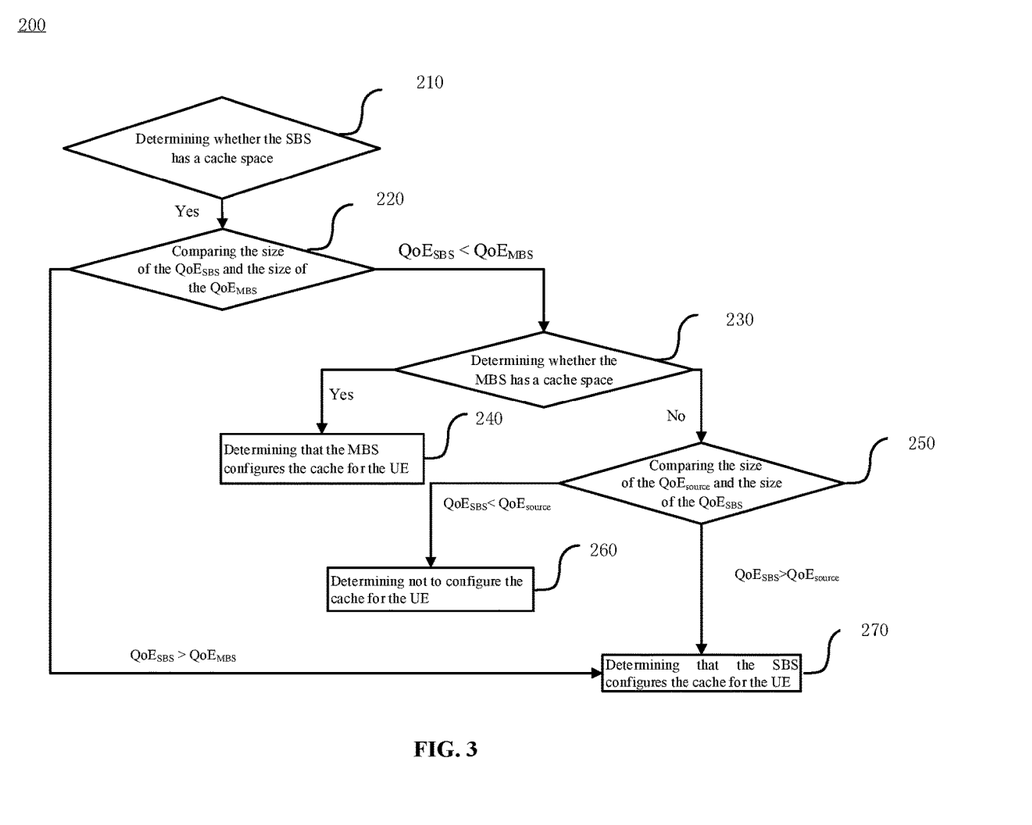
FIG. 3 is a schematic flowchart of a data caching method according to yet another embodiment of the present invention.

Specifically, in another embodiment, as shown in FIG. 3, the data caching method 200 comprises all the steps in the data caching method 100, wherein step 160 further comprises the following steps.

210. Whether the SBS has a cache space is determined. If yes, step 210 is executed.

220. The size of $QoE_{SBS}$ and the size of $QoE_{MBS}$ are compared.

When $QoE_{SBS}<QoE_{MBS}$, step 230 is executed, and when $QoE_{SBS}>QoE_{MBS}$, step 270 is executed.

230. Whether the MBS has a cache space is determined. If yes, step 240 is executed. If not, step 250 is executed.

240. It is determined that the MBS configures the cache for the UE.

250. The size of the $QoE_{source}$ and the size of the $QoE_{SBS}$ are compared.

When $QoE_{SBS}<QoE_{source}$, step 260 is executed, and when $QoE_{SBS}>QoE_{source}$, step 270 is executed.

260. It is determined not to configure the cache for the UE.

270. It is determined that the SBS configures the cache for the UE.

According to the data caching method provided in the above embodiment, when the $QoE_{source}$ is not the largest, the QoE from the UE to the data source of the service data is not the best, and it is necessary to preferably configure the cache for the UE in the SBS and the MBS.

The preferable principle is to preferably determine the SBS. Specifically, in the present embodiment, the SBS has the cache space, and the $QoE_{SBS}$ is the largest. Preferably, the SBS configures the cache for the UE.

Specifically, in the present embodiment, each of the SBS and the MBS has the cache space, but the $QoE_{MBS}$ is the largest, and preferably the MBS configures the cache for the UE.

The SBS has the cache space. If the $QoE_{MBS}$ is the largest, but the MBS has no cache space, at this point, the $QoE_{source}$ and the $QoE_{SBS}$ are compared; when the $QoE_{source}$ is larger, it is determined not to configure the cache for the UE. If the $QoE_{SBS}$ is larger, and it is determined that the SBS configures the cache for the UE.

In the above embodiment, by comprehensively determining the three QoE values and the cache space conditions of the SBS and MBS, the optimal device which can configure the cache for the UE is selected, thereby avoiding the failed caching caused by only considering the QoE values without considering the device cache space. Meanwhile, the SBS device is preferentially determined. The cache occupancy of the MBS is saved, the use efficiency of the resource of the MBS is improved, and the QoE values are optimized to improve the QoE.

Figure 4:
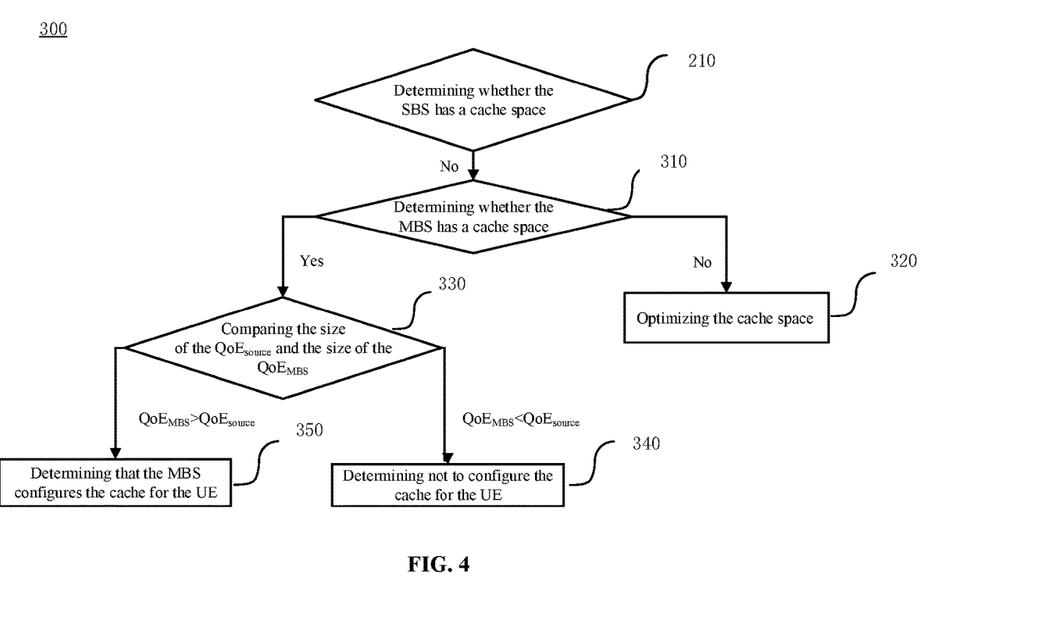
FIG. 4 is a schematic flowchart of a data caching method according to still a further embodiment of the present invention.

Specifically, in another embodiment, as shown in FIG. 4, the data caching method 300 comprises all the steps in the data caching method 100, wherein step 160 further comprises the following steps.

210. Whether the SBS has a cache space is determined. If not, step 310 is executed.

310. Whether the MBS has a cache space is determined. If not, step 320 is executed, and if yes, step 330 is executed.

320. The cache space is optimized.

330. The size of the $QoE_{source}$ and the size of the $QoE_{MBS}$ are compared.

When $QoE_{MBS}<QoE_{source}$, step 340 is executed, and when $QoE_{MBS}>QoE_{source}$, step 350 is executed.

340. It is determined not to configure the cache for the UE.

350. It is determined that the MBS configures the cache for the UE.

According to the data caching method provided in the above embodiment, when the $QoE_{source}$ is not the largest, it is indicated that the QoE from the UE to the data source of the service data is not the best, and it is necessary to preferably configure the cache for the UE in the SBS and the MBS.

Specifically, in the present embodiment, the SBS has no cache space, and the MBS has the cache space.

When $QoE_{MBS} > QoE_{source}$, preferably, the cache is configured for the UE in the MBS at this point.

When $QoE_{source} > QoE_{MBS}$, the cache is not configured for the UE, and the data source directly from the UE to the service data is preferable.

Specifically, in the present embodiment, each of the SBS and the MBS has no cache space, and the cache spaces of the MBS and the SBS need to be optimized.

In the above embodiment, by comprehensively determining the QoE values and the cache space conditions of the SBS and MBS, when the SBS has no cache space, the optimal device which can configure the cache for the UE is selected, thereby avoiding the failed cache application caused by only considering the QoE values without considering whether the SBS and MBS have the cache space. The QoE values are optimized to improve the QoE.

In particular, the embodiment of the present invention further provides a storage medium, which stores the instructions for causing a computer to execute the data caching method described in the above embodiment when the computer reads the instructions.

It should be understood that, in the embodiments of the present invention, the size of the sequence numbers of the above processes does not mean the order of execution sequence, and the execution order of respective processes should be determined by the function and internal logic thereof, and should not constitute any limitation to the implementation of the embodiments of the present invention.

In addition, the term "and/or" herein is merely an association relationship describing an associated object, and indicates that there may exist three relationships, for example, A and/or B may indicate three conditions that A exists separately, A and B exist at the same time, and B exists separately. In addition, the character "/" herein generally indicates an "or" relationship between the contextual objects.

Those of ordinary skill in the art will appreciate that the elements and algorithm steps of the various examples described in connection with the embodiments disclosed herein can be implemented in the form of electronic hardware, computer software, or a combination of both. For clarity of the interchangeability of the hardware and software, the composition and steps of the various examples have been generally described in terms of function in the above description. Whether these functions are executed in the form of the hardware or software depends on the specific application and design constraints of the technical solution. Those skilled in the art can use different methods for implementing the described functions for each particular application, but such implementation should not be considered to be beyond the scope of the present invention.

Those skilled in the art can clearly understand that, for the convenience and brevity of the description, the specific working processes of the systems, the devices and the units described above can refer to the corresponding processes in the foregoing method embodiments, and details are not described herein again.

In the several embodiments provided by the present application, it should be understood that the disclosed systems, devices, and methods may be implemented in other manners. For example, the device embodiments described above are merely illustrative. For example, the division of the units is only logical function division. In actual implementation, there may exist other division manners. For example, multiple units or components may be combined or integrated into another system, or some features may be ignored or not executed. In addition, the mutual coupling or direct coupling or communication connection shown or discussed may be indirect coupling or communication connection by certain interfaces, devices or units, or electrical connection, mechanical connection or the connection of other forms.

The units described as separate components may or may not be physically separate, and the components displayed as units may or may not be physical units, that is, may be located in one place, or may be distributed to multiple network units. Part or all of the units may be selected according to actual needs to achieve the objectives of the solutions of the embodiments of the present invention.

In addition, respective functional units in respective embodiments of the present invention may be integrated into one processing unit, or each unit may exist physically and separately, or two or more units may be integrated into one unit. The above integrated unit may be implemented in the form of hardware or in the form of a software functional unit.

The integrated unit, if implemented in the form of the software functional unit and sold or used as an independent product, can be stored in a computer readable storage medium. Based on such understanding, the part of the technical solution of the present invention which contributes in essence or to the prior art, or all or part of the technical solution may be embodied in the form of a software product. The computer software product is stored in a storage medium including a number of instructions. The instructions cause a computer device (which may be a personal computer, server, or network device, etc.) to execute all or part of the steps of the various embodiment methods of the present invention. The foregoing storage medium comprises various mediums that can storage program codes, such as a U disk, a mobile hard disk, a read-only memory (ROM), a random access memory (RAM), a magnetic disk, or an optical disk.

The above is only the specific embodiments of the present invention, but the scope of the present invention is not limited thereto. Various equivalent modifications or substitutions that can be easily conceived by those skilled in the art within the technical scope disclosed by the present invention are intended to be covered within the scope of protection of the present invention. Therefore, the scope of protection of the present invention should be determined by the scope of the claims.

We claim:

1. A data caching method, comprising steps of:
receiving a cache request sent by user equipment (UE), wherein the cache request is configured to request to cache service data;
acquiring first network status data between a small cell base station (SBS) accessed by the UE and the UE, second network status data between a macro-cell base station (MBS) corresponding to the SBS and the UE, and third network status data between the UE and a data source of the service data, respectively;

acquiring, according to the types of the first network status data, the second network status data, the third network status data, and the service data, three corresponding user quality of experience (QoE) values, respectively; and determining whether a cache is configured for the UE according to the three QoE values, wherein determining whether a cache is configured for the UE according to the three QoE values comprises:

when $QoE_{source}$ corresponding to the third network status data is the largest of the three QoE values, determining not to configure the cache for the UE;

otherwise, determining to configure the cache for the UE, wherein determining to configure the cache for the UE comprises:

determining whether each of the SBS and the MBS has a cache space; and configuring the cache for the UE according to a first determining result, wherein configuring the cache for the UE according to the determining result comprises:

comparing the size of $QoE_{MBS}$ corresponding to the second network status data and the size of $QoE_{SBS}$ corresponding to the first network status data when the first determining result is that the SBS has the cache space;

determining that the SBS configures the cache for the UE when $QoE_{SBS} > QoE_{MBS}$;

determining whether the MBS has the cache space when $QoE_{SBS} < QoE_{MBS}$; and configuring the cache for the UE according to a second determining result, and wherein configuring the cache for the UE according to a second determining result comprises:

determining that the MBS configures the cache for the UE when the second determining result is that the MBS has the cache space;

otherwise, comparing the size of the $QoE_{source}$ and the size of the $QoE_{SBS}$; and determining that the SBS configures the cache for the UE when $QoE_{SBS} > QoE_{source}$.

2. The data caching method according to claim 1, further comprising:

determining whether the MBS has the cache space when the first determining result is that the SBS has no cache space; and configuring the cache for the UE according to a third determining result.

3. The data caching method according to claim 2, wherein configuring the cache for the UE according to a third determining result comprises:

comparing the size of the $QoE_{source}$ and the size of the $QoE_{MBS}$ when the third determining result is that the MBS has the cache space; and determining that the MBS configures the cache for the UE when $QoE_{MBS} > QoE_{source}$.

4. The data caching method according to claim 2, further comprising:

when the third determining result is that the MBS has no cache space, optimizing the cache space.

5. A non-transitory computer readable storage medium, wherein the non-transitory computer readable storage medium stores instructions therein, which cause a computer to execute the data caching method according to claim 1, when the computer reads the instructions.

* * * * *